United States Patent
Shi et al.

(10) Patent No.: US 10,046,813 B2
(45) Date of Patent: Aug. 14, 2018

(54) PART ASSEMBLY AND VEHICLE DEFLECTOR ASSEMBLY EMPLOYING THE SAME

(71) Applicant: FORD GLOBAL TECHNOLOGIES, LLC, Dearborn, MI (US)

(72) Inventors: Jian Shi, Suzhou (CN); Koby Wang, Nanjing (CN); Joe Wang, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 52 days.

(21) Appl. No.: 15/239,548

(22) Filed: Aug. 17, 2016

(65) Prior Publication Data
US 2017/0050594 A1   Feb. 23, 2017

(30) Foreign Application Priority Data
Aug. 18, 2015   (CN) .......................... 2015 1 0509351

(51) Int. Cl.
B62D 35/02 (2006.01)
B62D 35/00 (2006.01)

(52) U.S. Cl.
CPC ........... B62D 35/02 (2013.01); B62D 35/005 (2013.01)

(58) Field of Classification Search
CPC ....... B62D 35/00; B62D 35/005; B62D 35/02
USPC .......................................... 296/180.1, 180.2
See application file for complete search history.

(56) References Cited

U.S. PATENT DOCUMENTS

| 4,778,212 A | 10/1988 | Tomforde |
| 6,644,700 B2 * | 11/2003 | Ito ............................ B60R 19/48 180/903 |
| 6,719,359 B2 | 4/2004 | Steinicke et al. |
| 6,964,441 B2 * | 11/2005 | Ariga ...................... B60R 19/18 293/117 |
| 8,297,685 B2 | 10/2012 | Wolf et al. |
| 8,517,451 B2 * | 8/2013 | Kakiuchi ............... B62D 35/02 296/180.1 |
| 8,523,270 B2 | 9/2013 | Marlier et al. |
| 2015/0210324 A1 * | 7/2015 | Kojima ................ B62D 35/005 296/180.1 |

(Continued)

FOREIGN PATENT DOCUMENTS

| DE | 102008061560 A1 | 8/2009 |
| DE | 102009040678 A1 | 4/2010 |

(Continued)

OTHER PUBLICATIONS

English translation of FR 2953798; retrieved Dec. 5, 2017 via PatentTranslate located at www.epo.org. (Year: 2017).*

(Continued)

*Primary Examiner* — Jason S Daniels
(74) *Attorney, Agent, or Firm* — Jason Rogers; King & Schickli, PLLC

(57) ABSTRACT

A part assembly includes: a first part and a second part. The first part defines thereupon an aperture and a first tongue extending from a first edge of the aperture. The first tongue and an opposing second edge of the aperture together define there-between a clearance. The second part defines a foot to be at least partially received through the clearance and to contact the first tongue at an assembled position.

16 Claims, 4 Drawing Sheets

(56) References Cited

U.S. PATENT DOCUMENTS

Figure 1:
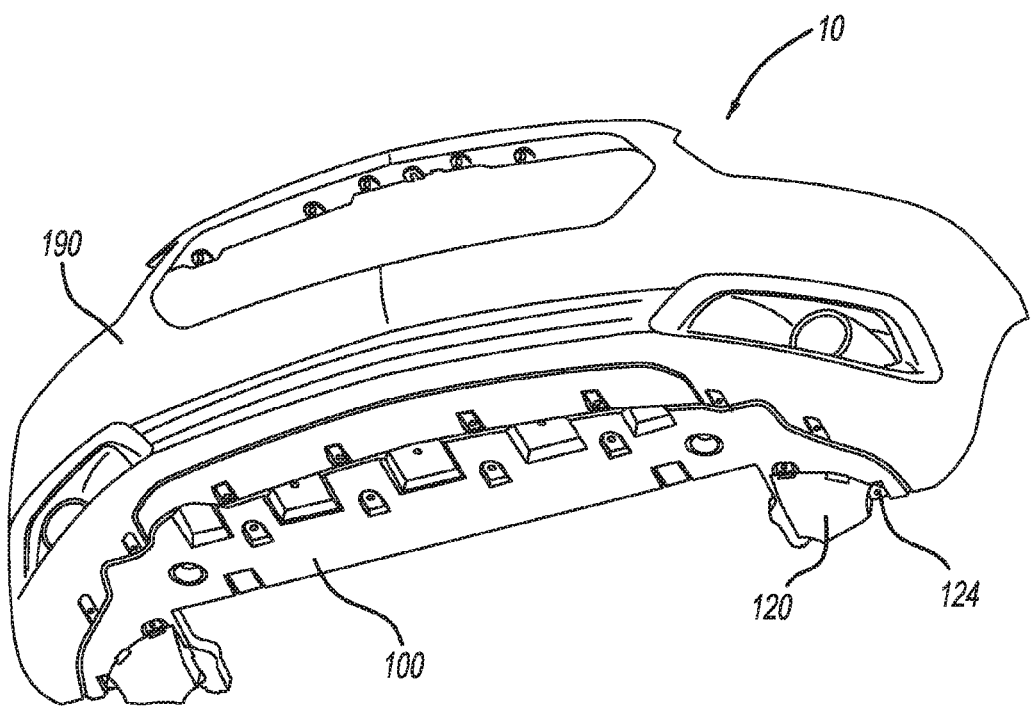

2015/0225026 A1\* 8/2015 Ohira ................... B62D 25/08
296/180.1

FOREIGN PATENT DOCUMENTS

DE     102010053463 A1    6/2012
FR        2953798 A1 \*   6/2011   ......... B62D 35/005

OTHER PUBLICATIONS

English Machine Translation of DE102008061560A1.
English Machine Translation of DE102009040678.
English Machine Translation of DE102010053463A1.

\* cited by examiner

PART ASSEMBLY AND VEHICLE DEFLECTOR ASSEMBLY EMPLOYING THE SAME

RELATED APPLICATION

This application claims the benefit of Chinese New Invention Patent Application No.: CN 201510509351.X, filed on Aug. 18, 2015, the entire contents thereof being incorporated herein by reference.

TECHNICAL FIELD

The present invention relates to a part assembly and a vehicle deflector assembly employing the same.

BACKGROUND

When a vehicle is moving at a high speed, an incoming air flow may hit and hence impart a relatively large resistance to the tire of the vehicle. Thus, a tire spoiler is often employed to reduce such a wind drag.

U.S. Pat. No. 8,297,685 discloses a tire spoiler.

In certain designs, a tire spoiler may be positioned on a deflector located under a front end of the vehicle to obtain structural stability.

SUMMARY

In one or more embodiments, a part assembly includes a first part defining thereupon an aperture and a first tongue extending from a first edge of the aperture. The first tongue and an opposing second edge of the aperture together define there-between a clearance. The part assembly also includes a second part defining a foot to be at least partially received through the clearance and to contact the first tongue at an assembled position. The first tongue is of a first elevation relative to the second edge along an assembly direction.

In another or more embodiments, a deflector assembly of a vehicle is provided. The deflector assembly includes a deflector defining thereupon an aperture and a first tongue extending from a first edge of the aperture. The first tongue and an opposing second edge of the aperture together define a clearance positioned between the first tongue and the second edge. The first tongue is spaced apart with a distance from the second edge along an assembly direction. Further, the first tongue defines a first portion extending in a first direction and a second portion positioned between the first portion and the first edge. The second portion extends in a second direction different from the first direction, the first direction being of a smaller directional differential to the assembly direction than the second direction.

One or more advantageous features as described herein will be readily apparent from the following detailed description of one or more embodiments when taken in connection with the accompanying drawings.

BRIEF DESCRIPTION OF THE DRAWING FIGURES

Figure 2:
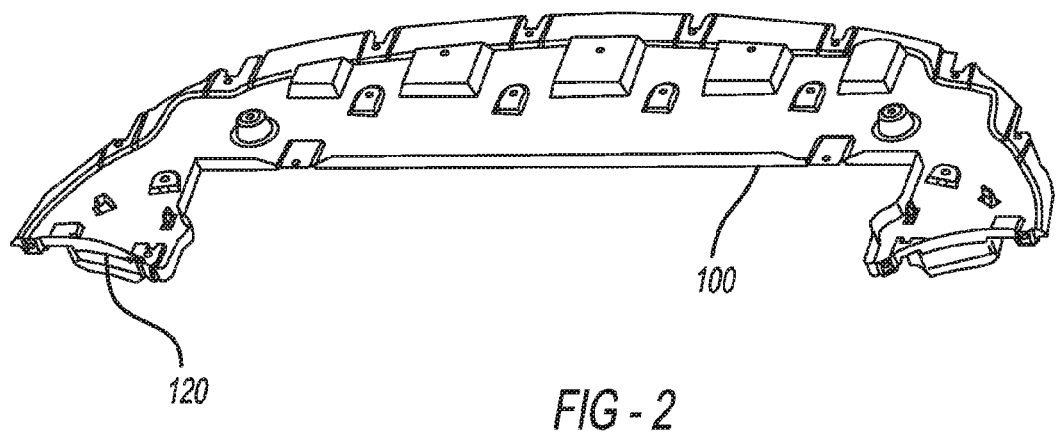
Figure 3A:
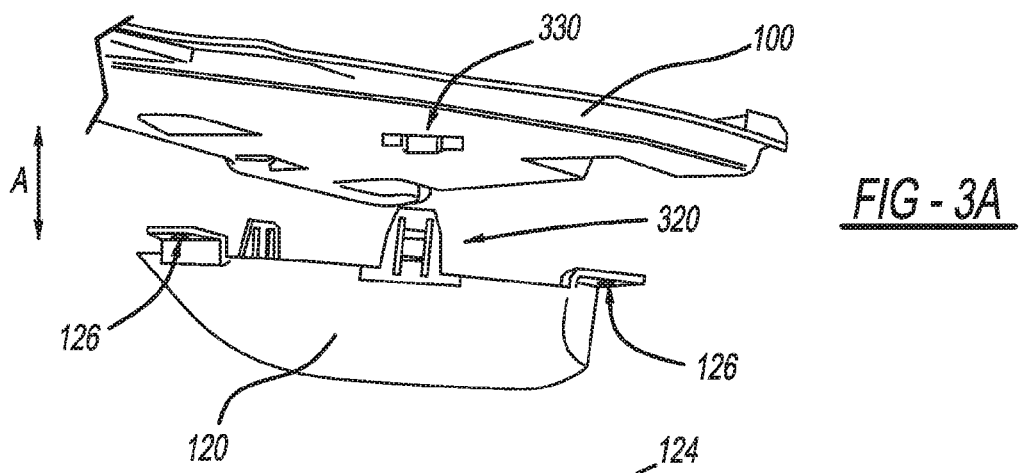
Figure 3B:
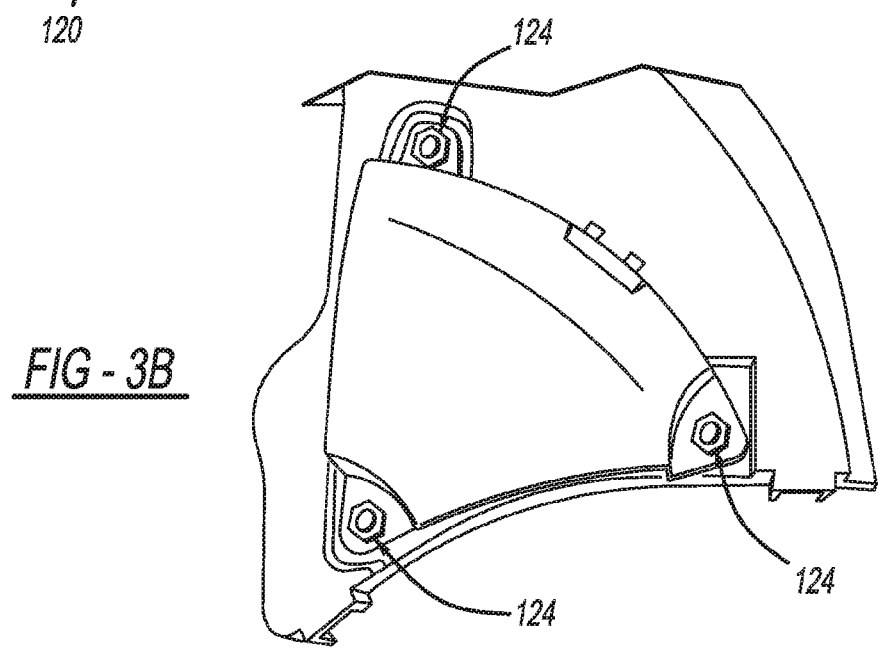
Figure 3C:
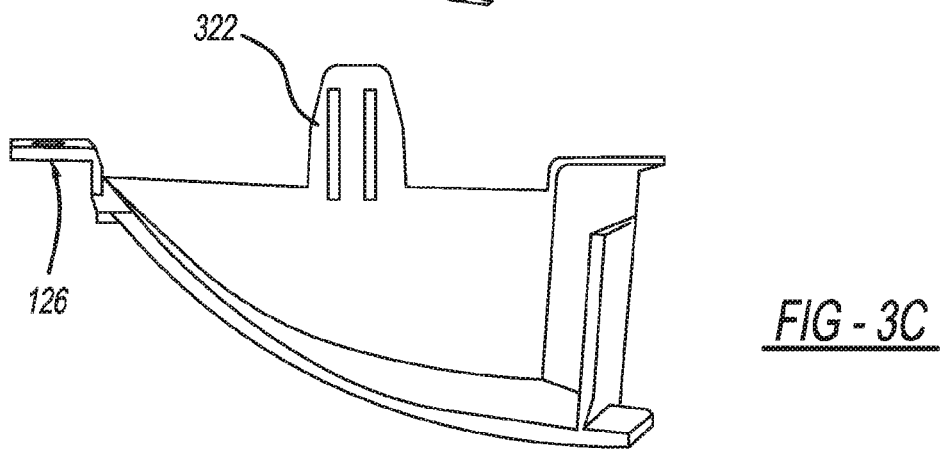
Figure 4A:
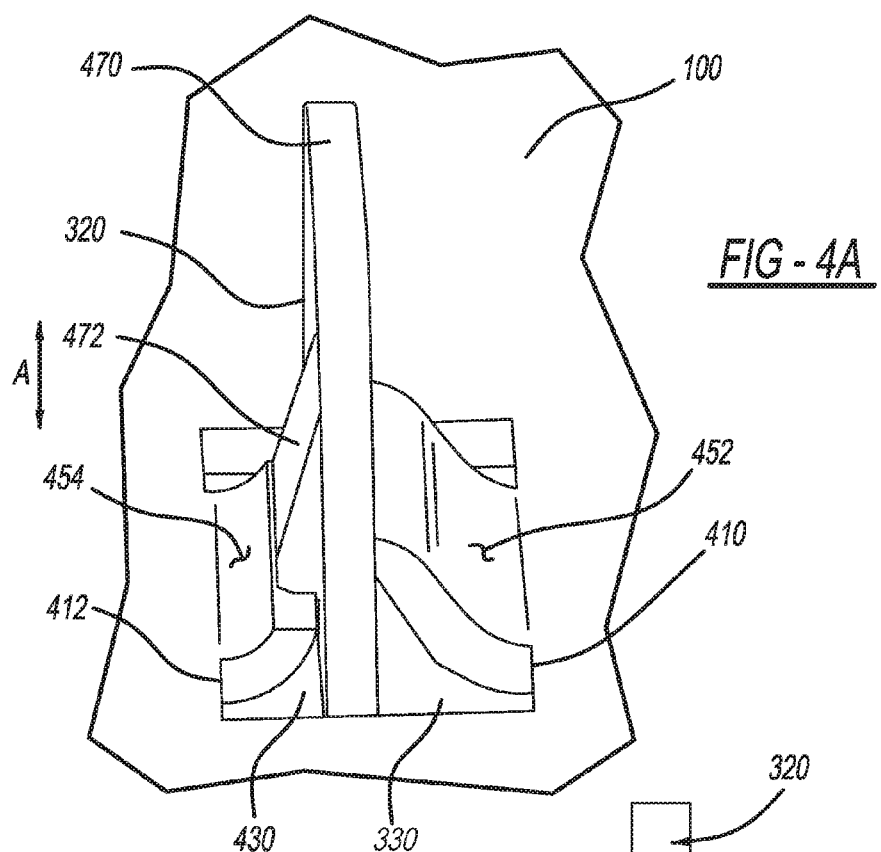
Figure 4B:
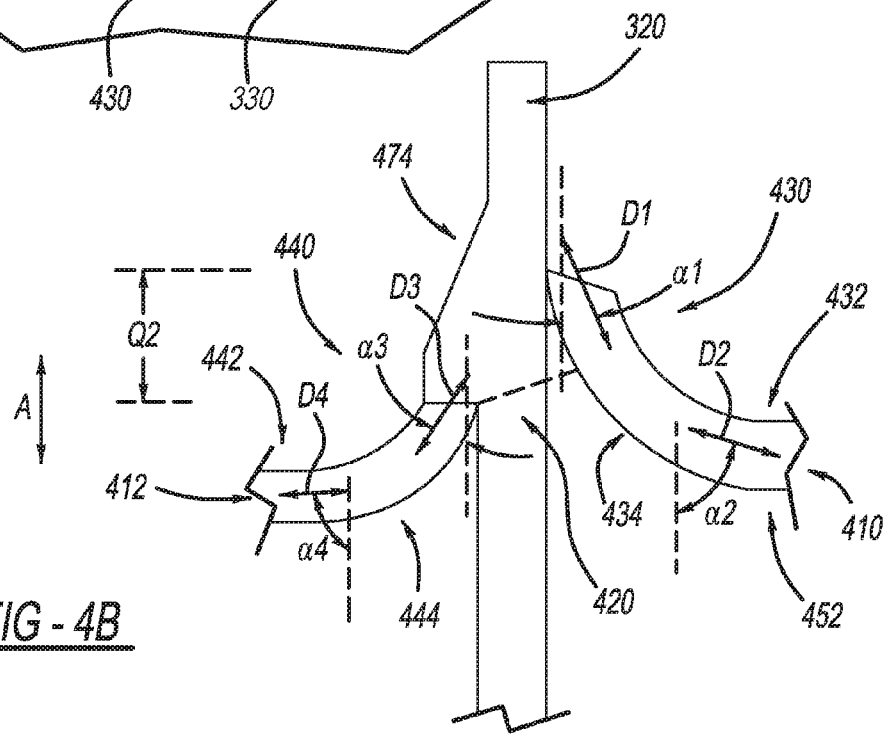
Figure 5:
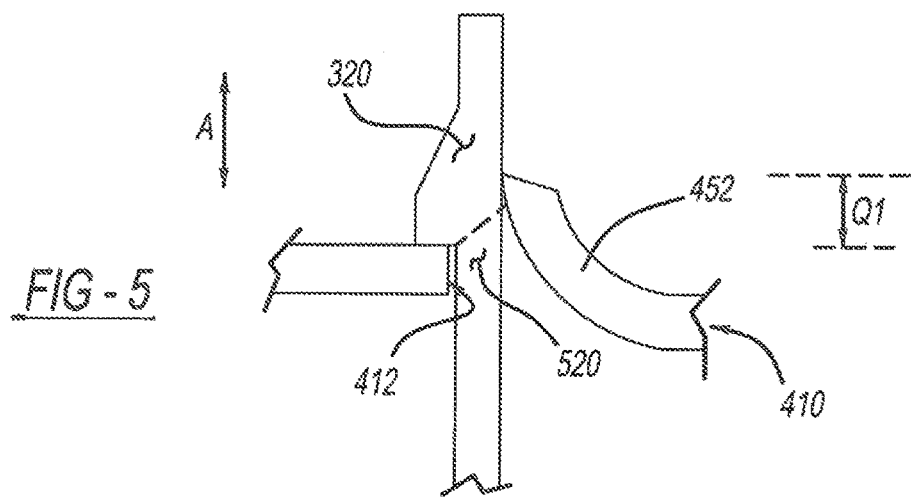
Figure 6:
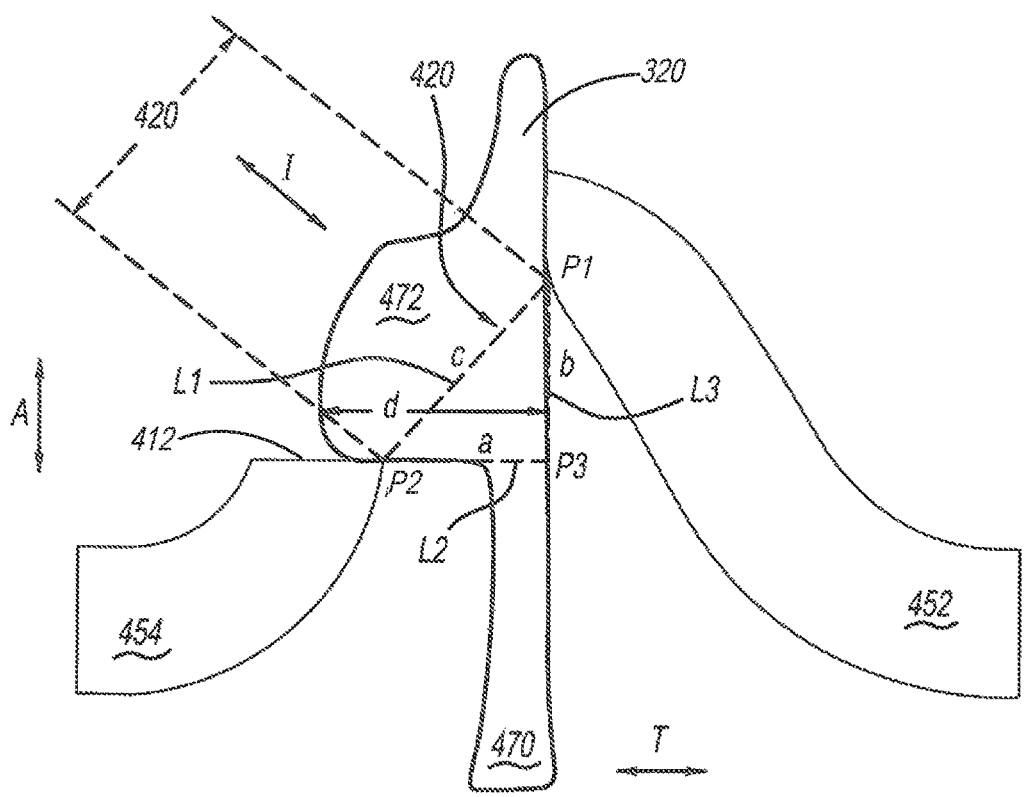

FIG. 1 illustratively depicts a front perspective view of a part assembly as being mounted onto a vehicle bumper according to one or more embodiments;

FIG. 2 illustratively depicts a back perspective view of the part assembly referenced in FIG. 1;

FIG. 3A illustratively depicts an exploded view of a first part and a second part of the part assembly referenced in FIG. 2;

FIG. 3B illustratively depicts an assembled view of the first part and the second part referenced in FIG. 3A;

FIG. 3C illustratively depicts a side view of the second part referenced in FIG. 3A;

FIG. 4A illustratively depicts an enlarged partial assembled view of the first part and the second part referenced in FIG. 3B;

FIG. 4B illustratively depicts an enlarged partial side view of the first part and the second part at an assembled position referenced in FIG. 4A;

FIG. 5 illustratively depicts an enlarged partial side view of an alternative of the first part and the second part referenced in FIG. 4B; and FIG. 6 illustratively depicts an enlarged partial view of the first part referenced in FIG. 4B.

DETAILED DESCRIPTION

As required, particular embodiments of the part assembly are disclosed herein; however, it is appreciated that the disclosed embodiments are merely exemplary and may be variable and modifiable. The drawings referenced herein are schematic and may be enlarged or minimized, and associated views thereof are not necessarily drawn to scale. As referenced in the FIG.s, the same reference numerals may be used herein to refer to the same parameters and components or their similar modifications and alternatives. These parameters and components are included as examples and are not meant to be limiting. Accordingly, particular structures and functional details as disclosed herein are not limiting, and are presented as representative basis via which those in the technical area may be guided to carry out the part assembly in various forms.

A tire spoiler is often installed at the front of a vehicle and formed from a flexible or soft material. Thus, the deformable spoiler may avoid unnecessary friction against the tire surface and/or to the front bumper surface. When being assembled to the vehicle deflector, the tire spoiler often needs to first be pre-installed onto the vehicle deflector to facilitate an ultimate fixation operation carried out by an operator.

As detailed herein elsewhere, the part assembly, in one or more embodiments, is advantageous in reflecting the understanding that during a pre-installation of the tire spoiler, it is desirable to define an aperture on the deflector and to include a protrusion or foot on the tire spoiler for engagement to the aperture, or alternatively, to define an aperture on the tire spoiler and to include a protrusion or foot on the deflector. However, the tire spoiler is often made from flexible or soft material and the aperture of the deflector often needs to be sized to engage the foot of the tire spoiler with interference, thus it may be difficult to effectuate a smooth insertion of the foot into the aperture. Accordingly, it may take the operator relatively more time and effort to manage the insertion of the foot into the aperture, thus inevitably resulting in reduced operating efficiencies and increased cost in labor.

The part assembly, in one or more embodiments, is advantageous in at least providing parts and/or components via which a relative soft tire spoiler may be readily assembled onto a vehicle bumper with enhanced labor efficiencies and subsequent cost benefits.

With reference to FIG. 1 along with FIG. 2 through FIG. 5, a part assembly 10 is illustratively depicted as having been assembled onto a vehicle bumper 190 according to one or more embodiments of the part assembly. The part assembly 10 includes a first part 100 and a second part 120. The first part 100 includes an aperture 330 and a first tongue 452 extending from a first edge 410 of the aperture 330. The first tongue 452 and a second edge 412 of the aperture 330 opposing the first edge 410 together define there-between a clearance 520 as referenced in FIG. 5 or a clearance 420 as referenced in FIG. 4B. The second part 120 includes a foot 320 to be at least partially received through the clearance 420 or 520 and to contact the first tongue 452 at an assembled position as referenced in FIG. 1, FIG. 2 or FIG. 4A. Relative to the second edge 412 along an assembly direction "A", the first tongue 452 is of a first elevation Q1 as illustratively depicted in FIG. 5, or of a second elevation Q2 as illustratively depicted in FIG. 4B. With such a configuration, the second part 120 may be readily pre-installed onto the first part 100 with enhanced ease and efficiency, particularly when the second part 120 is softer in material than the first part 100.

The first part 100 may be but not limited to at least a portion of a vehicle deflector, the second part 120 may be but not limited to at least a portion of a tire spoiler. Similarly, the second part 120 may be but not limited to at least a portion of a vehicle front deflector, the first part 100 may be but not limited to at least a portion of a tire spoiler. Dependent upon a particular situation, the first part 100 and the second part 120 may be any suitable part, and their dimensions may vary as well when desirable. Furthermore, the first part 100 and the second part 120 may be assembled onto any suitable part of the vehicle such as but not limited to the vehicle bumper.

With continuing reference to FIG. 3A through 3C, after being pre-installed or pre-fixed, the connection between the first part 100 and the second part 120 may further be secured via by a fastener and in particular a metallic fastener 124. The fastener 124 may employ any suitable methods, for instance but not limited to bolts, rivets, and adhesives. The second part 120 and/or the first part 100 may further include a fastener hole 126 to receive the metallic fastener 124 for fixation onto the first part 100 and/or the second part 120. The fastener hole 126 may be positioned spaced apart from the foot 320.

Proper installation of the fastener 124 requires man power to align the first part 100 and the second part 120, then hold the two parts closely enough to each other, and then to often require both hands of the operator to secure the assembly with the fastener 124. Now with the benefit of the foot 320 of the second part 120 readily insertable through the aperture 330 onto the first part 100 so as to effect a pre-installation orientation, the operator may free one of his/her hands while completing both the aligning and attaching.

With continuing reference to FIG. 4A and FIG. 4B and further in view of FIG. 6, and in another one or more embodiments, the first part 100 may also include a second tongue 454 extending from the second edge 412 and directed toward the first tongue 452. As positioned, the first edge 410 is opposing the second edge 412. An external edge of the second tongue 454 forms a portion of the second edge 412. Therefore, the first tongue 452 and the second edge 412 together define there-between the clearance 420. Alternatively, it may also be appreciated that the first tongue 452 and the second tongue 454 together define there-between the clearance 420.

With further reference to FIG. 4A and FIG. 4B, the first tongue 452 includes a first portion 430 extending in a first direction "D1" and a second portion 432 positioned between the first portion 430 and the first edge 410, where the second portion 432 extends in a second direction "D2" different from the first direction "D1". An angle "α1" defined between the first direction "D1" and the assembly direction "A" is smaller in value than an angle "α2" defined between the second direction "D2" and the assembly direction "A" such that the first tongue 452 extends inclined above the aperture 330 and defines a first guide surface 434.

The second tongue 454 includes a third portion 440 extending in a third direction "D3" and a fourth portion 442 positioned between the third portion 440 and the second edge 412, where the fourth portion 442 extends in a fourth direction "D4" different from the third direction "D3". An angle "α3" defined between the third direction "D3" and the assembly direction "A" is smaller in value than an angle "α4" defined between the fourth direction "D4" and the assembly direction "A" such that the second tongue 454 extends inclined above the aperture 330 and defines a second guide surface 444.

Without wanting to be limited to any particular theory, the guide surfaces 434 and 444 are believed to help guide the foot 320 through the clearance 420 or 520, along an insertion direction "I" referenced in FIG. 6, which is different from the assembly direction "A" and at an angle to the assembly direction "A". Once the foot 320 is inserted through the clearance 420, 520, the foot 320 may then be re-positioned to be aligned with the assembly direction "A" such that a protrusion 472 is then to sit on the second edge 412 or in particular on the second tongue 454, with a back 470 balance-against the first tongue 452.

Although the first guide surface 434 and the second guide surface 444 are shown with an arc or a curve, the shapes thus shown are not limiting. The first guide surface 434 and the second guide surface 444 may also be for instance a flat inclined surface and/or with any surface textures that may work to provide additional friction suitable for pre-fixation orientation.

In certain other embodiments, angles α3 and α4 may each substantially define perpendicular relationship to the assembly direction "A", for instance within a range of 90 degrees plus and minus up to 15 degrees. Accordingly at the assembled position, the foot 320 contacts the second tongue 454 but not directly other portions of the second edge 412 of the aperture 330. This configuration of the second tongue 454 is believed to be advantageous in providing engagement assistance and support at a level of strength that is somewhat between the support strength provided by the second edge 412 and the support strength provided by the second tongue 454, when the angle α3 does not substantially define perpendicular relationship to the assembly direction "A". Therefore, such configuration may be tailored to meet the engagement of the first and second parts 100, 120 of various design parameters and materials.

In one or more embodiments, the first tongue 452 and the second tongue 454 differ in elevation along the assembly direction "A", and more particularly the first tongue 452 is higher than the second tongue 454 along the assembly direction "A" with an elevation difference of Q2. Similarly, the first guide surface 434 and the second guide surface 444 differ in elevation along the assembly direction "A", and the first guide surface 434 is positioned higher than the second guide surface 444 along the assembly direction "A". The first tongue 452 is positioned higher than the second edge 412 along the assembly direction "A" with a first elevation distance.

The second part 120 may include the foot 320 to be at least partially received through the clearance 420. The foot 320 includes the back 470 and the protrusion 472 extending out from the back 470, where at an assembled position, the back 470 contacts the first tongue 452 and the protrusion 472 contacts the second tongue 454 as illustratively depicted in FIG. 4A and FIG. 4B or contacts the second edge 412 as illustratively depicted in FIG. 5.

In one or more embodiments, the protrusion 472 may further include a third guide surface 474 such that the protrusion 472 has two adjacent portions along the assembly direction "A" with different thickness value. The guide surface 474 works to engage the guide surface 444 of the second tongue 454 to further ease the insertion of the foot 320 through the clearance 420, 520 along the insertion direction "I".

With reference to FIG. 6, which illustratively depicts a position relationship of the aperture 330, the first tongue 452 and the second tongue 454 along with second edge 412 of the first part 100 as referenced in FIG. 4A and FIG. 4B, where the foot 320 is shown at its assembled position. As detailed herein elsewhere, the first tongue 452 and the second tongue 454 differ in elevation along the assembly direction "A". Accordingly the first tongue 452 and the second tongue 454 define there-between the clearance 420, which for instance is represented by the shortest linear distance "c" between the first tongue 452 and the second tongue 454, or in particular the linear distance between a point P1 on the first tongue 452 and a point P2 on the second tongue 454.

With reference again to FIG. 6, the first tongue 452 is spaced apart from the second tongue 454 with a distance "a" in a transverse direction perpendicular to the assembly direction "A". The distance "a" may be defined as a linear distance between point P2 and point P3 with latter in turn defined by an intersection of a line L2 and a line L3, where line L2 passes through the point P2 and is parallel to the transverse direction, the line L3 passes through the point P1 and is parallel to the assembly direction "A". The straight line L3 is of a distance "b" between the point P1 and point P3.

With further reference again to FIG. 6, the first tongue 452 is positioned higher than the second tongue 454, and in particular higher than the second edge 412, in the assembly direction "A", accordingly the distance "c" is greater than the distance "a". Lines L1, L2 and L3 define three sides of a triangle, thus $c^2 = a^2 + b^2$. As illustratively depicted in FIG. 6, the foot 320 has a distance "d" defining a maximum width of the protrusion 470. Thus, in order to ensure that the foot 320 may pass through the aperture 330 and steadily through the clearance 420, the distance "c" is generally greater than or equal to the distance "d" such that the foot 320 may enter and be received through the aperture 330 while being tilted to take advantage of the distance "c" and to avoid the distance "a". In addition, in order to reasonably ensure a reliable pre-installation between the first part 100 and the second part 120, the distance "a" may need to be smaller than the distance "d" such that the foot 320 do not casually disengage the aperture 330 straight along the assembly direction "A".

In one or more embodiments, the foot 320 of the second part 120 and the first tongue 452 of the first part 100 differ in material, and under certain instances, the foot 320 of the second part 120 may be softer than the first tongue 452 of the first part 100 at the assembled position. The foot 320 of the second part 120 may include a polymeric material, for instance soft plastics or rubber. Although the distance "c" is as described herein to be greater than or equal to the distance "d", it is appreciated that because the foot 320 is softer than the first tongue 452, and dependent upon the flexibility of the material, material deformation facilitates an insertion of the foot 320 through the clearance 420 even if the distance "c" is somewhat smaller than the distance "d", for instance but not limited to 1 millimeter to 2 millimeters in difference.

As detailed herein elsewhere, FIG. 5 illustratively depicts an alternative view referenced in FIG. 4A, with a difference being in that the first part 100 as referenced in FIG. 5 does not include the second tongue 454 which is otherwise shown in FIG. 4A. The first part 100 defines thereupon the aperture 330 and the first tongue 452 extending from the first edge 410 of the aperture 330. The first tongue 452 and the second edge 412 of the aperture 330 opposing the first edge 410 together define there-between the clearance 520, where the clearance 520 may be determined according to FIG. 6 described herein elsewhere.

As disclosed above, the profile of the second edge 412 may be of a "⎯" shape referenced in FIG. 5 or a "⎍" shape referenced in FIG. 4A, and be located on the same plane as referenced in FIG. 5 or on different planes as referenced in FIG. 4A. The first tongue 452 extending from the aperture 330 is of an elevation relative to the second edge 412 along the assembly direction "A", and in particular the first tongue 452 is positioned higher than the second edge 412 along the assembly direction "A", and the first tongue 452 and the second edge 412 together define there-between the clearance 420.

In particular, the line L1 defining the clearance 420 is at an angle to the assembly direction "A", for instance, in a non-parallel configuration. Accordingly, a difference between the distance "c" of the clearance 420 and the distance "a" is created to impart a relative larger freedom for designing the width "d" of the protrusion 472 of the foot 320 of the second part 120 so as to facilitate insertion of the protrusion 472 through the clearance 420 while avoiding with reasonable certainty any slipping away of the protrusion 472 from the aperture 330 after the pre-installation is completed.

For pre-installation of the second part 120 onto the first part 100, the second part 120 along with the foot 320 moves upward along the assembly direction "A". Because the maximum dimension "d" at the protrusion 472 of the foot 320 is greater than the transverse distance "a", the back 470 of the foot 320 is pressed against the first tongue 452 and moves via turning along the guide surface 434. In addition, the guide surface 444 may also partake in facilitating the turning movement of the foot 330. As the protrusion 472 moves toward the clearance 420, and due to the beneficial design that the distance "c" of the clearance 420 is generally greater than the distance "a", the foot 320 may be better positioned to enter through the clearance 420 of distance "c" than through the neck of distance "a", such that the protrusion 472 may pass through the clearance 420 with greater ease. After the protrusion 472 enters through the clearance 420, any deformation of the foot 320 due to its turning may now at least be partially withdrawn due to the elasticity of the material. In addition, because the width "d" is greater than the distance "a", the protrusion 472 may sit on the second edge 412 relatively more stably. Accordingly, through the first part 100 with advantageous features as described herein, the operator may readily pre-install the second part 120 onto the first part 100 without necessarily needing additional tools or processes, and then carry out the final fixation by the fastener 124, even if the second part 120 is made of a soft material.

Embodiments described herein are exemplary and not meant to be limiting. One skilled in the art will readily recognize from such discussion, and from the accompanying drawings and claims that various changes, modifications and variations can be made therein without departing from the true spirit and fair scope of the part assembly as defined by the following claims.

What is claimed is:

1. A part assembly, comprising:
   a first part having an aperture defined therein and a first tongue extending from a first edge of the aperture, the first tongue and an opposing second edge of the aperture together defining there-between a clearance; and
   a second part defining a foot to be at least partially received through the clearance and to contact the first tongue at an assembled position, the first tongue being of a first elevation relative to the opposing second edge along an assembly direction.

2. The part assembly of claim 1, wherein the first tongue includes a first portion extending in a first direction and a second portion positioned between the first portion and the first edge, the second portion extending in a second direction different from the first direction.

3. The part assembly of claim 2, wherein the first direction is of a smaller directional differential to the assembly direction than the second direction.

4. The part assembly of claim 1, further comprising a second tongue extending from the opposing second edge and directed toward the first tongue.

5. The part assembly of claim 4, wherein the first tongue and the second tongue differ in elevation along the assembly direction.

6. The part assembly of claim 4, wherein the foot includes a back and a protrusion extending out from the back, the back is to contact the first tongue and the protrusion is to contact the second tongue at the assembled position.

7. The part assembly of claim 1, wherein the foot of the second part differs in material from the first tongue.

8. The part assembly of claim 1, wherein the foot of the second part is softer than the first tongue at the assembled position.

9. The part assembly of claim 1, wherein the foot of the second part includes a polymeric material.

10. The part assembly of claim 1, wherein the foot includes a back and a protrusion extending out from the back, the back is to contact the first tongue and the protrusion is to contact the opposing second edge at the assembled position.

11. The part assembly of claim 1, wherein the second part further includes a fastener hole to receive there-through a metallic fastener for fixation to the first part, the fastener hole is spaced apart from the foot.

12. The part assembly of claim 1, wherein a first one of the first part and the second part is at least a part of a vehicle front deflector, a second one of the first part and the second part is at least a portion of a tire spoiler.

13. A deflector assembly of a vehicle, comprising:
    a deflector defining thereupon an aperture and a first tongue extending from a first edge of the aperture, the first tongue and an opposing second edge of the aperture together defining there-between a clearance;
    wherein the first tongue is spaced apart with a distance from the opposing second edge along an assembly direction, the first tongue defining a first portion extending in a first direction and a second portion positioned between the first portion and the first edge, the second portion extending in a second direction different from the first direction, the first direction being of a smaller directional differential to the assembly direction than the second direction.

14. The deflector assembly of claim 13, further comprising a second tongue extending from the opposing second edge and directed toward the first tongue, wherein the first tongue and the second tongue differ in elevation along the assembly direction, the second tongue defining a third portion extending in a third direction and a fourth portion positioned between the third portion and the second edge, the fourth portion extending in a fourth direction different from the third direction, the third direction being of a smaller direction differential to the assembly direction than the fourth direction.

15. A part assembly, comprising:
    a first part having an aperture and a first tongue extending from a first edge of the aperture, the first tongue and an opposing second edge of the aperture together defining there-between a clearance, said first part further having a second tongue extending from the opposing second edge and directed toward the first tongue, wherein the second tongue includes a third portion extending in a third direction and a fourth portion positioned between the third portion and the opposing second edge, the fourth portion extending in a fourth direction different from the third direction; and
    a second part defining a foot to be at least partially received through the clearance and to contact the first tongue at an assembled position, the first tongue being of a first elevation relative to the opposing second edge along an assembly direction.

16. The part assembly of claim 15, wherein the third direction is of a smaller directional differential to the assembly direction than the fourth direction.

* * * * *